United States Patent
Kappertz et al.

(10) Patent No.: US 7,882,749 B2
(45) Date of Patent: Feb. 8, 2011

(54) METHOD AND APPARATUS FOR ASCERTAINING VOLUME- OR MASS-FLOW

(75) Inventors: Fred Kappertz, Hochwald (CH); Markus Rüfenacht, Dornach (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 12/308,092

(22) PCT Filed: Jun. 5, 2007

(86) PCT No.: PCT/EP2007/055516

§ 371 (c)(1),
(2), (4) Date: Sep. 1, 2009

(87) PCT Pub. No.: WO2007/141266

PCT Pub. Date: Dec. 13, 2007

(65) Prior Publication Data

US 2010/0024567 A1 Feb. 4, 2010

(30) Foreign Application Priority Data

Jun. 7, 2006 (DE) .................. 10 2006 026772

(51) Int. Cl.
*G01F 1/58* (2006.01)
(52) U.S. Cl. .................................. 73/861.12
(58) Field of Classification Search ............... 73/861.12, 73/861.17; 323/285
See application file for complete search history.

(56) References Cited

U.S. PATENT DOCUMENTS

| 3,380,301 | A |   | 7/1968  | Mannherz |
|-----------|---|---|---------|----------|
| 4,408,497 | A |   | 10/1983 | Suzuki |
| 4,784,000 | A | * | 11/1988 | Gaertner ................... 73/861.12 |
| 4,916,381 | A | * | 4/1990  | Gelecinskyj et al. ......... 323/285 |
| 5,443,552 | A | * | 8/1995  | Tomita ..................... 73/861.17 |

FOREIGN PATENT DOCUMENTS

DE 199 17 268 A1 11/2000

* cited by examiner

*Primary Examiner*—Jewel Thompson
(74) *Attorney, Agent, or Firm*—Bacon & Thomas, PLLC

(57) ABSTRACT

A method for ascertaining volume- or mass-flow of a magnetically conductive medium flowing through a magneto-inductive, flow-measuring device having a predetermined nominal-diameter, wherein a periodically alternating, magnetic field is caused to pass through the flow-measuring device, the actual rise time, until a constant magnitude of the magnetic field is reached, is ascertained, the actual rise time is compared with a desired rise time ascertained in the case of flow of a reference medium through the flow-measuring device, and, on the basis of a difference between actual rise time and desired rise time, a measurement error is ascertained and the actually measured volume- or mass-flow of the magnetically conductive medium is so corrected, that the measurement error is canceled.

9 Claims, 2 Drawing Sheets

METHOD AND APPARATUS FOR ASCERTAINING VOLUME- OR MASS-FLOW

TECHNICAL FIELD

The invention relates to a method and apparatus for ascertaining volume- or mass-flow of a medium flowing through a magneto-inductive, flow-measuring device of predetermined nominal-diameter.

BACKGROUND DISCUSSION

The calibrating of a magneto-inductive flow-measuring device is usually performed with water as a reference medium. Water is slightly diamagnetic, with the magnetic conductivity, or magnetic susceptibility, of water being relatively small. If the appropriately calibrated, flow-measuring device, or appropriately calibrated, device-type, is used at a later point in time, in the field, to measure flow of a medium having a high magnetic conductivity (such being the case, for example, when the medium has ferromagnetic fractions and, thus, a very high susceptibility), then the measured values are significantly corrupted, since the magnetically conductive medium influences the magnetic resistance of the measuring arrangement quite appreciably. The magnetically conductive medium can be e.g. water with magnetite additive. In the case of measurements of this type, measurement errors of up to 100% can occur. A reliable and reproducible measuring of the volume- or mass-flow is, in the case of such large measurement errors, naturally, no longer possible.

SUMMARY OF THE INVENTION

An object of the invention is to provide method and apparatus for precise determining of volume- or mass-flow of a magnetically conductive medium.

The object is achieved, as regards the method, by the features that: a periodically alternating magnetic field is caused to pass through the flow-measuring device; actual rise time until reaching a constant magnitude of the magnetic field is ascertained; the actual rise time is compared with a desired rise time ascertained during flow of a reference medium through the flow-measuring device; and, on the basis of a difference between actual rise time and desired rise time, a measurement error is ascertained and the currently measured volume- or mass-flow of the magnetically conductive medium is so corrected, that a measurement error is canceled. A difference between actual rise time and desired rise time lying outside predetermined tolerances is thus interpreted as meaning that a medium of high magnetic conductivity is flowing through the flow-measuring device.

The method of the invention makes use of the circumstance, that there is a marked functional relationship between rise time of the magnetic field and the magnetic conductivity of the medium flowing through the flow-measuring device. If the medium is magnetically conductive, then, as a result of increased magnetic resistance, the rise time of the magnetic field, or of the coil current, until reaching a constant magnetic field, increases, after which the measuring of the volume- or mass-flow occurs. To a first approximation, rise time is proportional to the magnetic conductivity of the medium: The higher the magnetic conductivity, the longer the rise time.

For increasing accuracy of measurement, it can, furthermore, be provided, that the functional dependence between the magnetic conductivity and the rise time is ascertained for each device type. The appropriate functional relationship is, according to the invention, ascertained beforehand; on the basis of a measured difference between actual rise time and desired rise time until reaching a constant magnetic field, the measurement error is ascertained; and an appropriately corrected, measured value is then output.

In an advantageous embodiment of the method of the invention, the desired rise time is ascertained during a calibration phase. Especially, the desired rise time is ascertained during the calibration phase as a function of a magnetically only weakly conductive medium and/or as a function of the flow-measuring system, composed of a measuring tube and a magnet system. While, in the first case, the ascertaining of the desired rise time is only dependent on the medium, it depends, in the second case, on occasion, also on device type. Essential variables of device type are nominal-diameter, material of the measuring tube, and the applied, magnet system.

The control method used for switching, or reversing, the magnetic field can, in principle, be any. Favorable, naturally, is to apply a method, in the case of which the desired rise time and, subsequently then, also the actual rise time are as short as possible, since, then, the measuring interval is relatively long. The simplest method is to apply a voltage to the magnet system, and to define the desired rise time as that length of time, until the magnetic field or the coil current flowing through the magnet system assumes an at least approximately constant value. In the case of an ideal magnet system or in the case of an ideal coil arrangement, the e.g. rectangular current curve would correspond to the course of the magnetic field produced by the coil arrangement. Usually, the coil-arrangements used for magneto-inductive flow-measuring devices include coil cores and/or pole shoes. The control/evaluation unit feeds the two coil arrangements a periodically alternating current, which is, ideally, constant in two half-periods of opposite and equal magnitude. Due to eddy currents arising in the pole shoes and in the cores, indeed, the controlled current is constant, not however, the produced magnetic field. Thus, a defined time, the so-called rise time, is needed, until the magnetic field reaches the desired, constant value. Only then is it possible to perform an exact measuring of volume- or mass-flow. As already mentioned, it is advantageous for an exact measuring, when, in every half-period, the time available for measurement is as long as possible. From this point of view, it is important to minimize the rise time.

In this connection, a known control method sends, during switch over of the magnetic field, for a short-time, a superelevated current through the magnet arrangement. The current is ideally so sized, that the arising eddy-currents are compensated. Furthermore, it is known to accelerate the following asymptotic approach to the constant, measuring, magnetic field by applying a short-time, opposing voltage to the coil arrangement.

In the method of the invention, an advantageous further development provides, that, on the basis of actual rise time and desired rise time, a correction factor is ascertained, with which the currently ascertained volume- or mass-flow is corrected.

As already mentioned above, water used as a reference medium is, preferably, a magnetically only weakly conductive medium. Especially, when the reference medium is water.

A further development of the method of the invention provides, that the actual rise time is averaged a number of periods of the periodically alternating magnetic field. Preferably, an average value is formed from n values.

According to the invention, it is possible to provide the user with, besides a correct measured value of volume- or mass-flow of the medium through the flow-measuring device, also information concerning the percentage of magnetically conductive material in the medium. Thus, by a comparison of the actual rise time until reaching a constant magnetic field with the corresponding desired rise time, the percentage of magnetic material in the medium flowing through the flow-measuring device is determined and output, for example, to a screen, a printer or the information is forwarded via a data bus or data line.

The object is achieved, as regards an apparatus, by the following arrangement:

A magnet system, which produces a periodically reversing, magnetic field passing through a measuring tube essentially transversely to a measuring tube axis;

at least one measuring electrode coupled with the medium and arranged in a region of the measuring tube;

a control/evaluation unit, which, on the basis of voltage induced in the at least one measuring electrode, ascertains information concerning the volume- or mass-flow of the medium according to a method as claimed in at least one of the method claims 1-8. Magneto-inductive flow-measuring devices having the basic structural features are well known. The method of the invention can be used generally in connection with any such flow-measuring device.

BRIEF DESCRIPTION OF THE DRAWINGS

The invention will now be explained in greater detail on the basis of the appended drawing, the figures of which show as follows.

DETAILED DESCRIPTION

Figure 1:
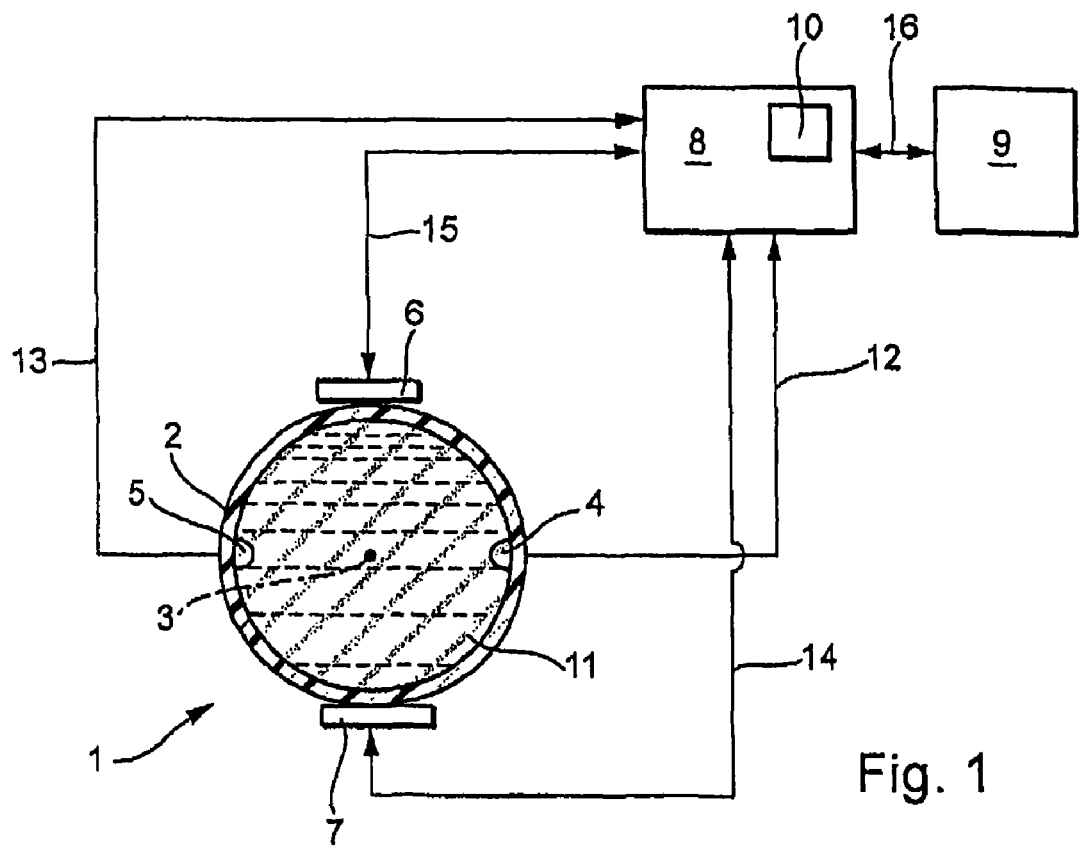
FIG. 1 a schematic drawing of a magneto-inductive, flow-measuring device for performing the method of the invention.

FIG. 1 shows a schematic drawing of a first embodiment of the apparatus 1 of the invention. Flowing through the measuring tube 2 in the direction of the measuring tube axis 3 is a medium 11. The medium 11 is, at least slightly, electrically conductive. The measuring tube 2 itself is made of a non-conductive material, or, at least, it is lined on its inner surface with a non-conductive material.

The magnetic field B directed perpendicularly to the flow direction of the medium 11 is produced by the diametrally arranged, coil arrangement 6, 7, or via two electromagnets. Under the influence of the magnetic field B, charge carriers located in the medium 11 migrate, depending on polarity, to the two oppositely poled, measuring electrodes 4, 5. The measurement voltage formed on the measuring electrodes 4, 5 is proportional to the flow velocity of the medium 11 averaged over the cross section of the measuring tube 2, i.e. it is a measure for the volume flow rate of the medium 11 in the measuring tube 2. Measuring tube 2 is, moreover, connected via connecting elements, e.g. flanges (not shown), with a pipe system, through which the medium 11 flows. In both illustrated cases, the measuring electrodes 4, 5 are in direct contact with the medium 11; the coupling can, however, as already mentioned above, also be accomplished capacitively.

Via connecting lines 12, 13, the measuring electrodes 4, 5 are connected with the control/evaluating unit 8. The connection between the coil arrangements 6, 7 and the control/evaluation unit 8 is accomplished via the connecting lines 14, 15. The control/evaluation unit 8 is connected via the connecting line 16 with an input/output unit 9. Associated with the evaluating/control unit 8 is a memory unit 10.

Figure 2:
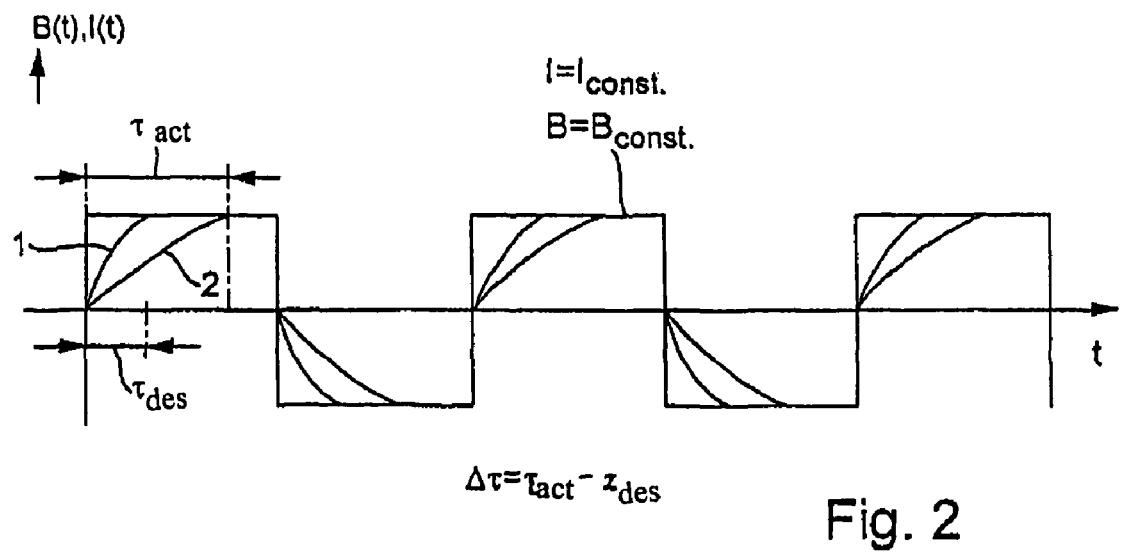
FIG. 2 a graph of the functional dependence of rise time as a function of the magnetic conductivity of the medium flowing through the flow-measuring device.

FIG. 2 is a graphical illustration characterizing functional dependence of the actual rise time $\tau_{act}$ as a function of the magnetic conductivity of the medium 11 flowing through the flow-measuring device 1. As already indicated above, the reversal of the magnetic field B(t) is usually controlled via the electrical current I(t) flowing through the coil arrangement 6, 7. The electrical current curve is rectangular in the illustrated case. In the ideal case, the magnetic field B(t) should behave in the same way as the electrical current—this, however, is not the case here, due to eddy currents occurring in the pole shoes and coil cores. Thus, a defined rise-time is needed, until the magnetic field reaches the desired constant value $B_{const}$ needed for performing the measurement.

FIG. 2 also shows the desired rise time $\tau_{des}$. This period of time was ascertained during calibration of the flow-measuring device 1 via the applied control method for switching the magnetic field B(t). The calibration is accomplished by producing at least two, defined, volume flows, which differ from one another. Used as calibration medium is usually water. If the flow-measuring device 1 is, however, subsequently used for measuring volume- or mass-flow of magnetically conductive media, the measuring device 1 delivers measured values, which are very strongly corrupted. The reason for this is that the magnetic resistance of the flow-measuring device 1 can change quite significantly in the case of flow of a magnetically conductive medium 11. As shown in FIG. 2, the actual rise time $\tau_{act}$ is significantly enlarged relative to the desired rise time $\tau_{des}$. The difference is due to the fact that the magnetically conductive medium has changed the magnet system. The measuring cycle is started after completion of the actual rise time.

Figure 3:
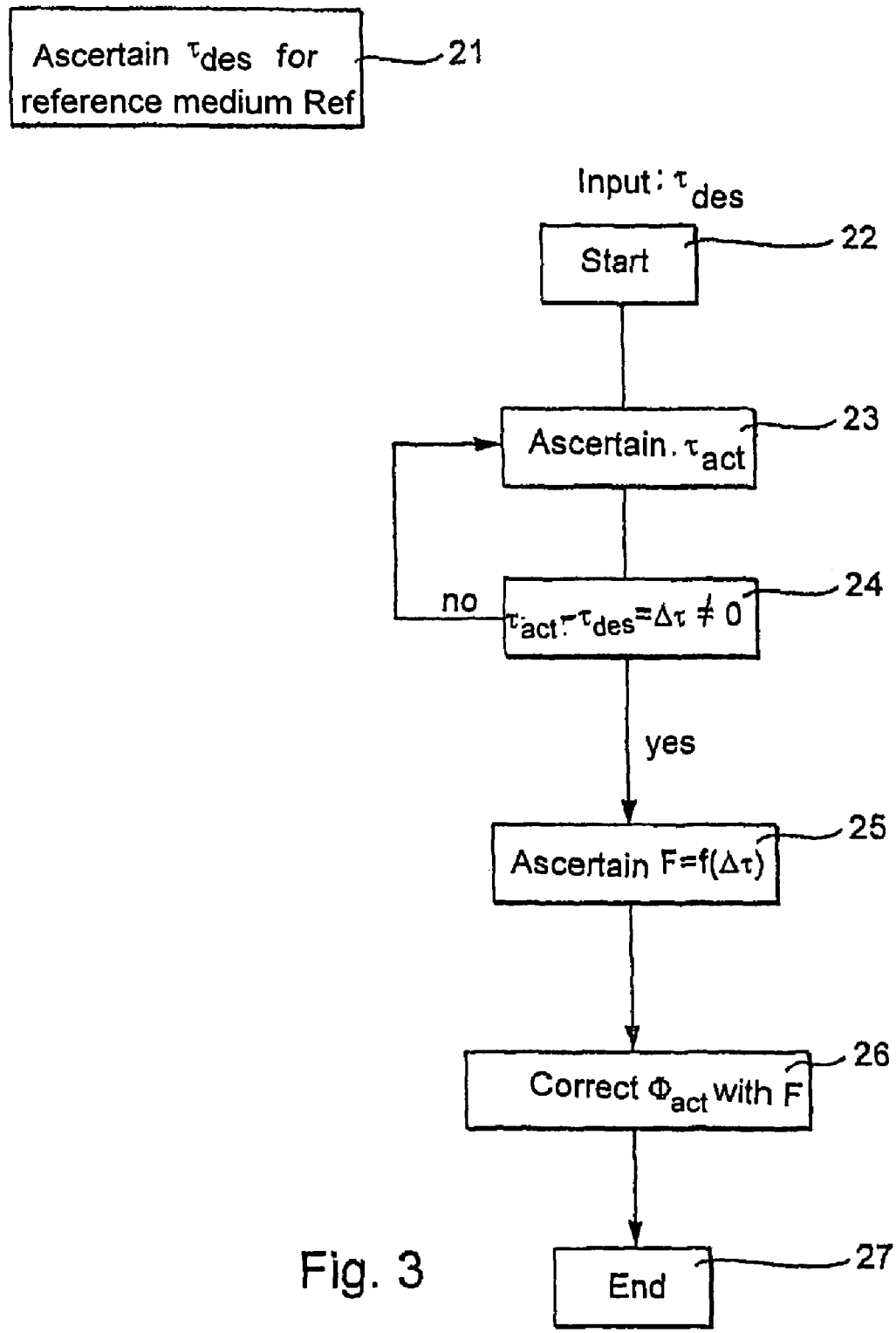
FIG. 3 a flow diagram of essential steps of the method of the invention.

According to the invention, a difference between the actual rise time $\tau_{act}$ and a predetermined desired rise time $\tau_{des}$ lying outside of a tolerance is interpreted to mean that a medium is flowing through the measuring device 1 that has a high magnetic conductivity and that a corresponding correction is necessary. In detail, the actual rise time $\tau_{act}$ is compared with a desired rise time $\tau_{des}$ ascertained in the case of flow $\Phi_{Ref}$ of a reference medium Ref through the flow-measuring device 1. Then, on the basis of a difference $\Delta\tau$ between actual rise time $\tau_{act}$ and desired rise time $\tau_{des}$, a measurement error E is ascertained and the actually measured volume- or mass-flow $\Phi_{act}$ of the magnetically conductive medium 11 is so corrected, that the measurement error E is compensated, or canceled. In this procedure, the fact is utilized, that the measurement error E is a function of the rise time $\tau_{act}$. Usually, there is, at least to a first approximation, a linear relationship between the measurement error and the rise time. The method of the invention is illustrated in the flow diagram of FIG. 3.

During a calibration phase of the magneto-inductive, flow-measuring device 1, the desired rise time $\tau_{des}$ is ascertained at a flow $\Phi_{Ref}$ of a reference medium Ref through the flow-measuring device 1 (Point 21). During regular measurement operation of the flow-measuring device 1, then the actual rise time $\tau_{act}$ until the reaching of a constant magnitude $B_{const}$ of the measuring magnetic field is ascertained (Point 23). If a deviation $\Delta\tau$ between the actual rise time $\tau_{act}$ and the desired rise time $\tau_{des}$ is found, then, on the basis of such difference, a measurement error E is ascertained (Point 24, Point 25). This is possible, since it has been found, that, between the measurement error E and a change of the actual rise time $\tau_{act}$ relative to the desired rise time $\tau_{des}$, there is a functional relationship. Then, the actually measured volume- or mass-flow $\Phi_{act}$ of the magnetically conductive medium 11 is so corrected, that the measurement error E is canceled (Point 26). In this way, it is possible with the flow-measuring device of the invention to ascertain also the volume- or mass-flow of a medium 11 correctly, even when such medium 11 is so composed, that it influences the magnetic resistance of the measuring system significantly. Such is—as already indicated—the case, when the medium 11 has a magnetic conductivity, which strongly differs from the magnetic conductivity of the reference medium, water.

The invention claimed is:

1. A method for ascertaining the volume- or mass-flow of a medium flowing through a magneto-inductive, flow-measuring device having a predetermined nominal-diameter, comprising the steps of:
   causing a periodically alternating magnetic field to pass through the flow-measuring device;
   ascertaining an actual rise time until reaching a constant magnitude of the magnetic field;
   comparing the actual rise time with a desired rise time ascertained for the case of flow of a reference medium through the flow-measuring device;
   interpreting a difference between the actual rise time and the desired rise time to mean flow of a magnetically conductive medium; and
   ascertaining a measurement error based on a difference between actual rise time and desired rise time as a function of the difference, and the actually measured volume- or mass-flow of the magnetically conductive medium is so corrected, that the measurement error is canceled.

2. The method as claimed in claim 1, further comprising the step of:
   ascertaining said desired rise time during a calibration phase.

3. The method as claimed in claim 1, wherein:
   said desired rise time is ascertained during the calibration phase as a function of a magnetically non-conductive medium and/or as a function of flow measurement system comprising a measuring tube and a magnet system.

4. The method as claimed in claim 1, further comprising the step of:
   ascertaining a correction factor, based on the actual rise time and the desired rise time, with which actually ascertained volume- or mass flow is corrected.

5. The method as claimed in claim 1, wherein:
   a magnetically non-conductive medium is applied as reference medium.

6. The method as claimed in claim 5, wherein:
   water is applied as reference medium.

7. The method as claimed in claim 1, further comprising the step of:
   averaging the actual rise time over a plurality of periods of the periodically alternating, magnetic field.

8. The method as claimed in claim 1, wherein:
   based on a comparison of actual rise time for reaching a constant magnetic field and corresponding desired rise time, the percentage of the magnetically conductive material in the medium flowing through the flow-measuring device is ascertained and output.

9. An apparatus for measuring volume- or mass-flow of a magnetically conductive medium flowing through a measuring tube in direction of a measuring tube axis, comprising:
   a magnet system, which produces a periodically reversing, magnetic field passing through the measuring tube essentially transversely to the measuring tube;
   at least one measuring electrode coupled with the medium and arranged in a region of the measuring tube; and
   a control/evaluation unit, which, based on measurement voltage induced in said at least one measuring electrode, ascertains information concerning volume- or mass-flow of the medium according to the following:
   causing a periodically alternating magnetic field to pass through the flow-measuring device;
   ascertaining an actual rise time until reaching a constant magnitude of the magnetic field;
   comparing the actual rise time with a desired rise time ascertained for the case of flow of a reference medium through the flow-measuring device;
   interpreting a difference between the actual rise time and the desired rise time to mean flow of a magnetically conductive medium; and
   ascertaining a measurement error based on a difference between actual rise time and desired rise time as a function of the difference, and the actually measured volume- or mass-flow of the magnetically conductive medium is so corrected, that the measurement error is canceled.

* * * * *